(12) United States Patent
Long

(10) Patent No.: US 8,910,539 B2
(45) Date of Patent: Dec. 16, 2014

(54) ROBOT WITH REDUCER

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 13/488,584

(22) Filed: Jun. 5, 2012

(65) Prior Publication Data

US 2013/0081502 A1   Apr. 4, 2013

(30) Foreign Application Priority Data

Sep. 30, 2011   (CN) .......................... 2011 1 0297014

(51) Int. Cl.
  *B25J 17/00*  (2006.01)
  *B25J 17/02*  (2006.01)
  *B25J 18/00*  (2006.01)
  *B25J 9/10*   (2006.01)

(52) U.S. Cl.
  CPC ...... *B25J 9/102* (2013.01); *B25J 9/104* (2013.01); *B25J 17/0258* (2013.01); *Y10S 901/27* (2013.01)
  USPC ........................ 74/490.05; 74/490.01; 901/27

(58) Field of Classification Search
  CPC .......... B25J 18/00; B25J 17/00; B25J 9/1025; Y10S 901/27; Y10S 901/21; Y10S 901/28; Y10S 901/19
  USPC ............... 74/490.01, 490.03, 490.04, 490.05; 901/19, 21, 27
  See application file for complete search history.

(56) References Cited

U.S. PATENT DOCUMENTS

| | | | |
|---|---|---|---|
| 4,538,047 A * | 8/1985 | Nakano et al. ............. | 219/125.1 |
| 6,877,392 B2 * | 4/2005 | Markert ..................... | 74/490.05 |
| 7,513,173 B2 * | 4/2009 | Ono ........................... | 74/490.03 |
| 8,316,735 B2 * | 11/2012 | Nogami et al. ............ | 74/490.03 |
| 2008/0034920 A1 | 2/2008 | Inoue et al. | |
| 2011/0252921 A1 * | 10/2011 | Nakagiri et al. ............. | 74/665 R |

FOREIGN PATENT DOCUMENTS

| | | |
|---|---|---|
| CN | 2625122 Y | 7/2004 |
| TW | 200631743 A | 9/2006 |

* cited by examiner

*Primary Examiner* — Justin Krause
(74) *Attorney, Agent, or Firm* — Novak Druce Connolly Bove + Quigg LLP

(57) ABSTRACT

A robot includes a base seat, a first arm fixed to the base seat, a second arm rotatably connected to the first arm, an output shaft rotatably connected to a distal end of the second arm, a first driving member, and a first transmission mechanism. The first transmission mechanism includes a first transmission belt and a reducer. The first driving member is located at one end of the first arm adjacent to the base seat, the reducer is located at the other end of the first arm away from the base seat, and connected to the second arm, the first driving member is capable of driving the reducer via the first transmission belt.

20 Claims, 2 Drawing Sheets

ROBOT WITH REDUCER

BACKGROUND

1. Technical Field

The present disclosure generally relates to industrial robots, and particularly to a robot with a reducer.

2. Description of Related Art

Many industrial robots include a base seat, a first arm fixed to the base seat, and a second arm rotatably connected to the first arm. An actuator, such as a detector, a welding device, a gripper or a cutting tool, is mounted at a distal end of the second arm of the industrial robotic to execute specific tasks. In robots of this kind, each arm rotates around a rotation axis driven by a driving unit. Typically, the driving unit includes a motor mounted on the first arm and a transmission mechanism coupled to the motor to transmit the movement of the motor to the second arm. The motor and the transmission mechanism are both located at the same end of the first arm in order to decrease the longitudinal length of the first arm, which thereby increase the lateral width of the first arm, affect the rotation of the second arm, and increase the failure rate of the second arm.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
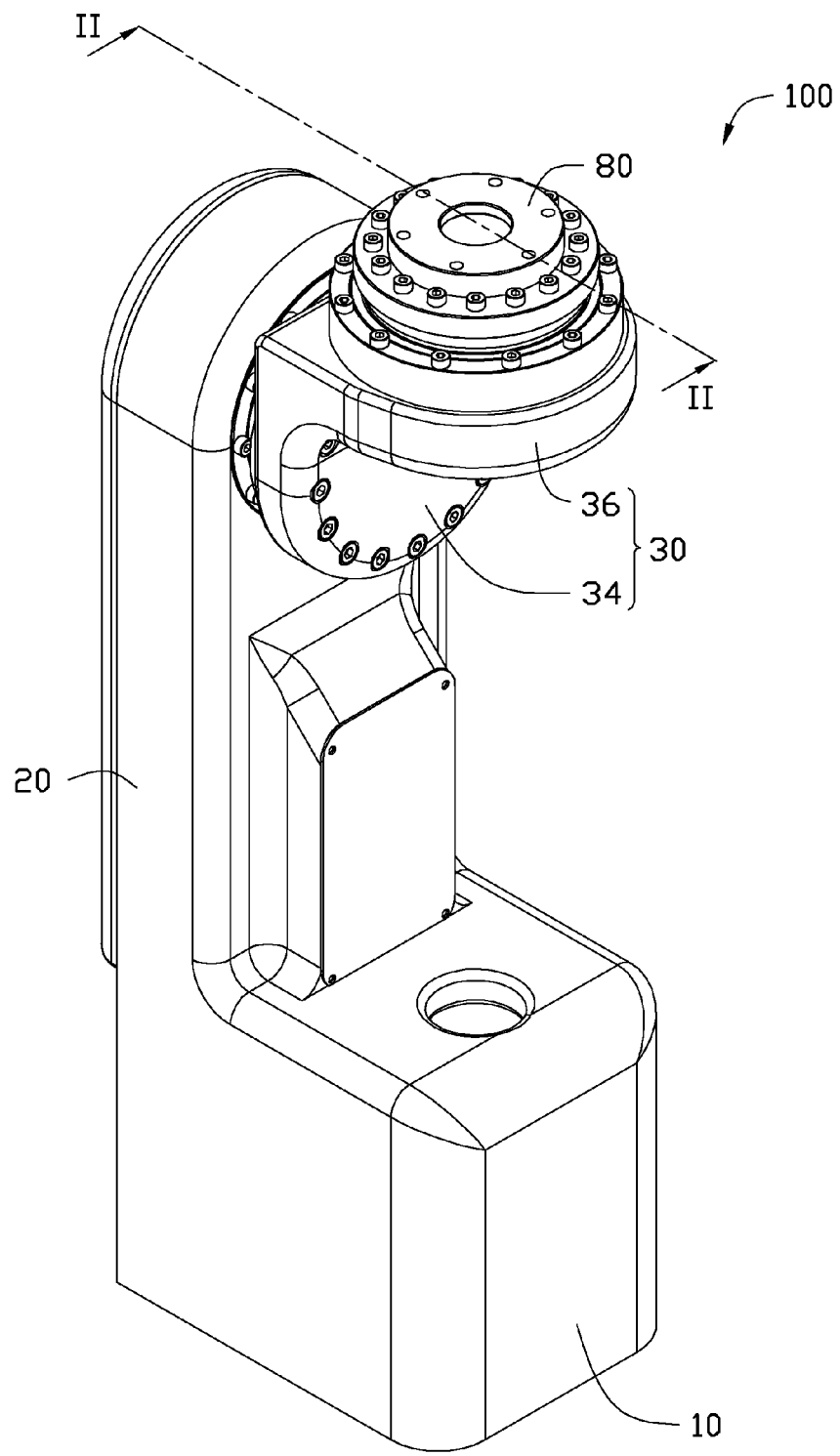
FIG. 1 is an assembled, isometric view of an embodiment of a robot.
Figure 2:
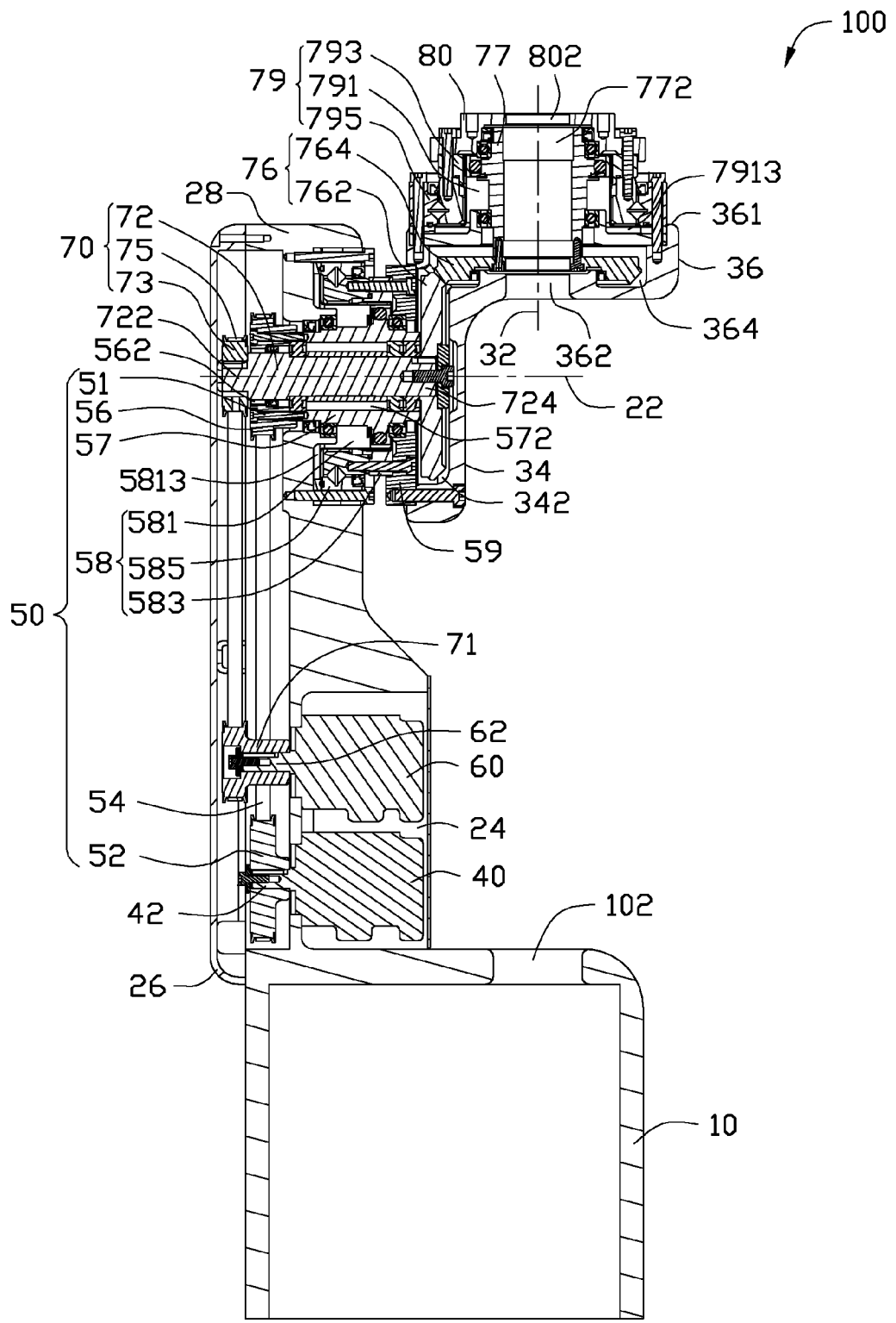
FIG. 2 is a cross-sectional view of the robot of FIG. 1, taken along the line II-II.

FIGS. 1 and 2, show an embodiment of a robot 100 including a base seat 10, a first arm 20, a second arm 30, a first driving member 40, a first transmission mechanism 50, a second driving member 60, a second transmission mechanism 70, and an output shaft 80. The first arm 20 has a first axis 22, and the second arm 30 has a second axis 32 substantially perpendicular to the first axis 22. The first arm 20 is fixed to the base seat 10, the second arm 30 is rotatably connected to the first arm 20, and the output shaft 80 is rotatably connected to a distal end of the second arm 30.

The base seat 10 is substantially a hollow rectangular block, and defines a guiding hole 102 at an end of the base seat 10 adjacent to the first arm 20.

The first arm 20 is substantially a hollow cylinder, and defines a receiving portion 24 substantially at a center portion thereof, and forms a first connecting portion 26 and a second connecting portion 28 on opposite ends of the receiving portion 24. The receiving portion 24 receives the first driving member 40, the first transmission mechanism 50, the second driving member 60, and the second transmission mechanism 70. The first connecting portion 26 is fastened to the base seat 10. The second connecting portion 28 is connected to the second arm 30.

The second arm 30 is substantially L-shaped, and includes a fastening portion 34, and an output portion 36 substantially perpendicular to the fastening portion 34. The fastening portion 34 is fastened to the second connecting portion 28 of the first arm 20. The fastening portion 34 extends along a direction substantially perpendicular to the first axis 22, and defines a receiving groove 342 adjacent to the first arm 20. The output portion 36 extends from an end of the fastening portion 34 along a direction substantially perpendicular to the second axis 32, and forms an end surface 361. The output portion 36 defines a guiding hole 362 along the second axis 32. The end surface 361 defines a receiving groove 364 surrounding the guiding hole 362. The receiving groove 364 communicates with the guiding hole 362. In the illustrated embodiment, the guiding hole 102 is aligned with and intercommunicates with the guiding hole 362 along the second axis 32.

The first driving member 40 has a drive shaft 42 and is received in an end of the receiving portion 24 adjacent to the first connecting portion 26. In the illustrated embodiment, the first driving member 40 is a motor.

The first transmission mechanism 50 includes a first drive wheel 52, a first transmission belt 54, a first action wheel 56, a transmission member 57, a reducer 58, and a connecting member 59.

The first drive wheel 52 is assembled on the drive shaft 42. The first transmission belt 54 is sleeved on the first drive wheel 52 and the first action wheel 56. The transmission member 57 is received in the receiving portion 24 adjacent to the second connecting portion 28, and the first action wheel 56 is fixed on an end of the transmission member 57 via a plurality of screws 51. The first action wheel 56 defines a pivot hole 562 along the first axis 22, and the transmission member 57 defines a pivot hole 572 along the first axis 22.

The reducer 58 includes a flexspline 581 and a rigid gear 583. The flexspline 581 is substantially a cylindrical shell, and includes a containing portion (not labeled) and a flange 5813 formed on one end of the containing portion. A plurality of first teeth (not labeled) is separately formed on an end of the outer surface of the containing portion away from the flange 5813. The rigid gear 583 is substantially ring-shaped, and a plurality of second teeth (not labeled) is formed on the inner surface of the rigid gear 583 for engaging with the corresponding first teeth. The flexspline 581 is sleeved and non-rotatably fixed on the transmission member 57. The rigid gear 583 is rotatably sleeved on the containing portion of the flexspline 581 with the second teeth of the rigid gear 583 engaged with the first teeth of the receiving portion 24. In the illustrated embodiment, the number of teeth of the first teeth is less than that of the second teeth. A bearing 585 is sleeved on the containing portion of the flexspline 581 and positioned between the flange 5813 and the rigid gear 583, the outer ring of the bearing 585 is fixed to the flange 5813, and the inner ring of the bearing 585 is fixed to the rigid gear 583.

The connecting member 59 is sleeved on the transmission member 57 via a bearing (not labeled) disposed between the connecting member 59 and the transmission member 57. One end of the connecting member 59 is fixed to the rigid gear 583, and the other end of the connecting member 59 is fixed to the second arm 30.

The second driving member 60 is received in an end of the receiving portion 24 adjacent to the first connecting portion 26, and arranged side by side with the first driving member 40. The second driving member 60 has a rotation shaft 62. In the illustrated embodiment, the second driving member 60 is an electrical motor.

The second transmission mechanism 70 includes a second drive wheel 71, a transmission shaft 72, a second action wheel 73, a second transmission belt 75, a pair of bevel gears 76, a transmission member 77, and a reducer 79.

The second drive wheel 71 is fixedly sleeved on the rotation shaft 62. The second transmission belt 75 is sleeved on the second drive wheel 71 and the second action wheel 73. The transmission shaft 72 forms a transmission end 722 and a fastening end 724 on opposite ends thereof. The fastening end 724 extends through the pivot hole 572 of the transmission member 57 and the pivot hole 562 of the first action wheel 56, and the transmission end 722 protrudes from the first action wheel 56. The second action wheel 73 is fixedly sleeved on the transmission end 722. The fastening end 724 is received in the receiving groove 342 of the fastening portion 34.

In the illustrated embodiment, the pair of bevel gears 76 includes a first bevel gear 762 and a second bevel gear 764 that are meshed with each other. The transmission member 77 defines a guiding hole 772 along the second axis 32. The first bevel gear 762 is non-rotatably sleeved on the fastening end 724 of the transmission shaft 72. The second bevel gear 764 is non-rotatably sleeved on the transmission member 77.

The reducer 79 is similar to the reducer 58, and includes a flexspline 791 and a rigid gear 793. The flexspline 791 includes a containing portion (not labeled) and a flange 7913 formed on one end of the containing portion. A plurality of first teeth (not labeled) is separately formed on an end of the outer surface of the containing portion of the flexspline 791 away from the flange 7913. The rigid gear 793 has a plurality of second teeth (not labeled) formed on the inner surface of the rigid gear 793 for engaging with the corresponding first teeth. The flexspline 791 is sleeved on and non-rotatably fixed on the transmission member 77. The rigid gear 793 is rotatably sleeved on the containing portion of the flexspline 791 with the second teeth of the rigid gear 793 engaged with the first teeth of the flexspline 791. A bearing 795 is sleeved on the containing portion and positioned between the flange 7913 and the rigid gear 793, the outer ring of the bearing 795 is fixed to the flange 7913, and the inner ring of the bearing 795 is fixed to the rigid gear 793.

The output shaft 80 is substantially ring-shaped. In the illustrated embodiment, the output shaft 80 defines a guiding hole 802 along the second axis 32. The guiding holes 802, 772, and 362 are aligned in the second axis 32. The output shaft 80 is sleeved on the transmission member 77 and non-rotatably fixed on the rigid gear 793.

In use, a spraying tool is fixed to the output shaft 80, by partially inserting it into the guiding hole 802. The first driving member 40 drives the first drive wheel 52 to rotate, and the first action wheel 56 is driven to rotate by the first drive wheel 52 via the first transmission belt 54. The first action wheel 56 drives the transmission member 57 to rotate together with the flexspline 581 relative to the first arm 20. The flexspline 581 drives the rigid gear 583 to rotate together with the connecting member 59. The connecting member 59 drives the second arm 30 to rotate.

The second driving member 60 drives the second drive wheel 71 to rotate, which in turn drives the second action wheel 73 to rotate via the second transmission belt 75. The second action wheel 73 drives the transmission shaft 72 to rotate together with the first bevel gear 762 relative to the first arm 20. The first bevel gear 762 drives the second bevel gear 764 to rotate together with the transmission member 77 relative to the second arm 30. The transmission member 77 drives the flexspline 791 to rotate, which drives the rigid gear 793 to rotate together with the output shaft 80. The output shaft 80 drives the spraying tool to rotate.

The first driving member 40 is received in one end of the receiving portion 24 adjacent to the first connecting portion 26, and the reducer 58 is received in the other end of the receiving portion 24 adjacent to the second connecting portion 28, which reduces the lateral width of the first arm 20 and increases the flexibility of the first arm 20. Furthermore, the spraying tool is fastened to the output shaft 80, and pipings connected to the spraying tool extend through both the guiding holes 362 and 772. Therefore, when the spraying tool rotates together with the output shaft 80, the tubings or pipings are aligned with the second axis 32, thereby avoiding being wound on the second arm 30 and increasing the flexibility of the second arm 30. It should be appreciated that, the spraying tool may be replaced by a detector or a welding tool, and a plurality of data lines or electrical cables can be received in the guiding holes 362, 772.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot comprising:
   a base seat;
   a first arm fixed to the base seat;
   a second arm rotatably connected to the first arm;
   an output shaft rotatably connected to a distal end of the second arm;
   a first driving member located at one end of the first arm adjacent to the base seat;
   a first transmission mechanism comprising:
       a reducer located at the other end of the first arm away from the base seat and connected to the second arm, and
       a first transmission belt;
   a second driving member located at one end of the first arm adjacent to the base seat and arranged side by side with the first driving member; and
   a second transmission mechanism comprising:
       a second drive wheel fixed to the second driving member and driven to rotate by the second driving member,
       a transmission shaft,
       a transmission member,
       a second action wheel non-rotatably fixed on one end of the transmission shaft, and
       a pair of bevel gears comprising:
           a first bevel gear fixed on the other end of the transmission shaft, and
           a second bevel gear engaging with the first bevel gear and non-rotatably fixed on one end of the transmission member.

2. The robot of claim 1, wherein the first arm defines a receiving portion at substantially a center portion thereof, and forms a first connecting portion and a second connecting portion on opposite ends of the receiving portion, the first connecting portion is fixed to the base seat, the second connecting portion is connected to the second arm, the first driving member is received in one end of the receiving portion adjacent to the first connecting portion, and the reducer is received in the other end of the receiving portion adjacent to the second connecting portion.

3. The robot of claim 1, wherein the first transmission mechanism further comprises a first drive wheel, a first action wheel, a transmission member, and a connecting member, the first drive wheel is fixed to the first driving member and driven to rotate by the first driving member, which drives the first action wheel via the first transmission belt, the reducer comprises a flexspline and a rigid gear engaging with the flexspline, the flexspline is non-rotatably fixed on the transmission member, the rigid gear is fixed to the connecting member, and the second arm is fixed to the connecting member.

4. The robot of claim 3, wherein the flexspline comprises a containing portion and a flange formed on one end of the containing portion, and a plurality of first teeth is separately formed on an end of the outer surface of the containing portion away from the flange.

5. The robot of claim 4, wherein the rigid gear is sleeved on the containing portion of the flexspline, and a plurality of second teeth is formed on the inner surface of the rigid gear for engaging with the corresponding first teeth.

6. The robot of claim 1, wherein the second transmission mechanism further comprises a reducer, the reducer comprises a flexspline fixed to the other end of the transmission member and a rigid gear engaging with the flexspline.

7. The robot of claim 6, wherein the flexspline comprises a containing portion and a flange formed on one end of the containing portion, and a plurality of first teeth is separately formed on an end of the outer surface of the containing portion away from the flange.

8. The robot of claim 7, wherein the rigid gear is sleeved on the containing portion of the flexspline, and a plurality of second teeth is formed on the inner surface of the rigid gear for engaging with the corresponding first teeth.

9. The robot of claim 8, wherein the output shaft is non-rotatably fixed on the rigid gear.

10. The robot of claim 1, wherein each of the second arm, the output shaft, and the transmission member defines a guiding hole, and the guiding holes are aligned in a straight line.

11. The robot of claim 1, wherein each of the first driving member and the second driving member is an electrical motor.

12. A robot comprising:
a base seat;
a first arm fixed to the base seat;
a second arm rotatably connected to the first arm;
an output shaft rotatably connected to a distal end of the second arm;
a first driving member located at one end of the first arm adjacent to the base seat;
a second driving member located at one end of the first arm adjacent to the base seat and arranged side by side with the first driving member;
a first transmission mechanism comprising:
  a first transmission belt, and
  a reducer located at the other end of the first arm away from the base seat and connected to the second arm, the first driving member driving the reducer of the first transmission mechanism via the first transmission belt; and
a second transmission mechanism comprising:
  a second transmission belt,
  a reducer the second driving member driving the reducer of the second transmission mechanism via the second transmission belt;
  a second drive wheel fixed to the second driving member and driven to rotate by the second driving member,
  a transmission shaft,
  a second action wheel non-rotatably fixed on one end of the transmission shaft,
  a transmission member,
  a pair of bevel gears comprising:
    a first bevel gear fixed on the other end of the transmission shaft, and
    a second bevel gear engaging with the first bevel gear and non-rotatably fixed on one end of the transmission member.

13. The robot of claim 12, wherein the first arm defines a receiving portion at substantially a center portion thereof, and forms a first connecting portion and a second connecting portion on opposite ends of the receiving portion, the first connecting portion is fixed to the base seat, the second connecting portion is connected to the second arm, the first driving member is received in one end of the receiving portion adjacent to the first connecting portion, and the reducer is received in the other end of the receiving portion adjacent to the second connecting portion.

14. The robot of claim 12, wherein the first transmission mechanism further comprises a first drive wheel, a first action wheel, a transmission member, and a connecting member, the first drive wheel is fixed to the first driving member and driven to rotate by the first driving member, which drives the first action wheel via the first transmission belt, the reducer comprises a flexspline and a rigid gear engaging with the flexspline, the flexspline is non-rotatably fixed on the transmission member, the rigid gear is fixed to the connecting member, and the second arm is fixed to the connecting member.

15. The robot of claim 14, wherein the flexspline comprises a containing portion and a flange formed on one end of the containing portion, and a plurality of first teeth is separately formed on an end of the outer surface of the containing portion away from the flange.

16. The robot of claim 15, wherein the rigid gear is sleeved on the containing portion of the flexspline, and a plurality of second teeth is formed on the inner surface of the rigid gear for engaging with the corresponding first teeth.

17. The robot of claim 12, wherein the second transmission mechanism further comprises a reducer, wherein the second driving member is capable of driving the reducer of the second transmission mechanism via the second transmission belt.

18. The robot of claim 12, wherein each of the second arm, the output shaft, and the transmission member defines a guiding hole, and the guiding holes are aligned in a straight line.

19. The robot of claim 12, wherein each of the first driving member and the second driving member is an electrical motor.

20. A robot comprising:
a base seat;
a first arm fixed to the base seat and having a first axis;
a second arm rotatably connected to the first arm and having a second axis perpendicular to the first axis;
an output shaft rotatably connected to a distal end of the second arm;
a first driving member located at one end of the first arm adjacent to the base seat;
a first transmission mechanism connected to the first driving member and the second arm, wherein the first driving member is configured to rotate the first transmission mechanism, and thereby rotating the second arm;
a second driving member located at one end of the first arm adjacent to the base seat and arranged side by side with the first driving member; and
a second transmission mechanism connected to the second driving member and the output shaft, wherein the second driving member is configured to rotate the second transmission mechanism, and thereby rotating the output shaft;
wherein each of the seat, the second arm, the second transmission mechanism, and the output shaft defines a guiding hole, and the guiding holes are aligned in a straight line.

* * * * *